Nov. 15, 1938.     H. JESS     2,136,851

CULTIVATOR ATTACHMENT

Filed Oct. 5, 1937

Inventor

Henry Jess,

By Thomas A. Battington
Attorney

Patented Nov. 15, 1938

2,136,851

UNITED STATES PATENT OFFICE 2,136,851

CULTIVATOR ATTACHMENT

Henry Jess, Sabula, Iowa

Application October 5, 1937, Serial No. 167,434

4 Claims. (Cl. 97—8)

This invention relates to an improved cultivator attachment and especially to an improved means for connecting the attachment, such as a rake, to the cultivator.

The primary object of my invention is to devise a satisfactory rake attachment to be drawn behind the plows or blades of a cultivator in such manner as to smooth or level off the furrowed top soil, ride over any rigid obstructions and readily discharge any weeds encountered in its path. In this connection it is a major object to provide an attachment means, for yieldingly urging the rake or similar device toward working position, which is strong and of a permanent character and yet which is light and so compactly disposed that it can not be accidentally damaged or removed and can not be rendered inoperative through accumulation of weeds or other foreign matter.

The attachment means comprises a pair of bars pivotally interconnected and normally held in engagement with each other by coil springs of the trosional type. As such springs surround the pivots they do not come into contact with obstructions nor are they in position to cause an accumulation of weeds.

It is a further object of my invention to devise an improved rake of this character comprising flexible tines formed of relatively light steel wire and arranged to ride in substantially vertical position through the earth's loosened topsoil.

These and further objects will clearly appear from a study of the following detailed description when taken in conjunction with the accompanying drawing and the appended claims.

Figure 1:
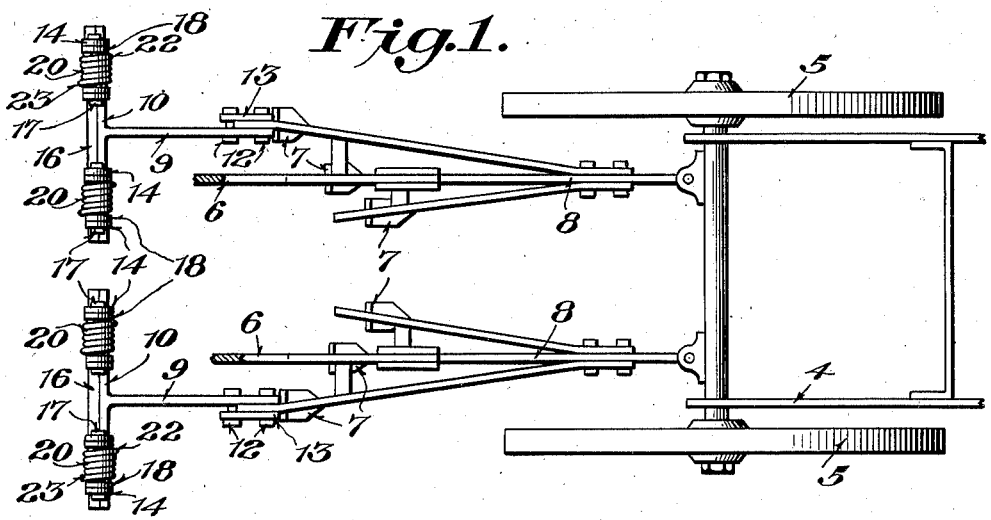
Figure 1 is a plan view of a cultivator, with parts broken away for clarity of illustration, having a preferred embodiment of my invention attached thereto.
Figure 2:
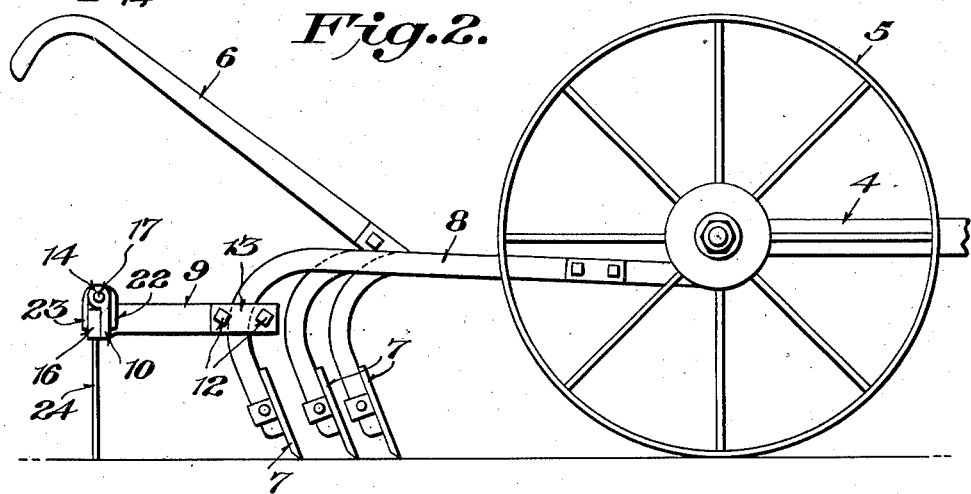
Figure 2 is a side elevational view of the apparatus of Fig. 1.
Figure 3:
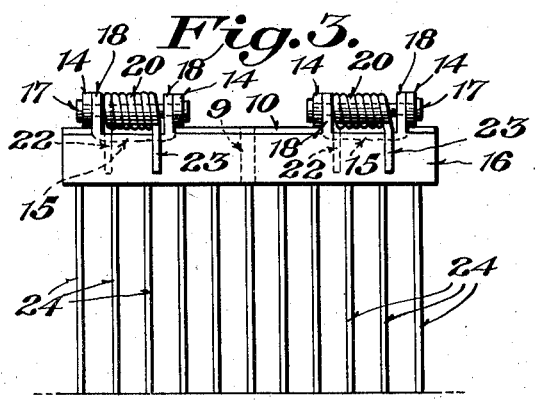
Figure 3 is a rear elevational view of the rake attachment seen in Figs. 1 and 2.

With continued reference to the drawing, wherein like numerals are employed to designate like parts, the numeral 4 indicates generally a horse-drawn cultivator comprising wheels 5, handles 6, and sets of plows or blades 7 carried at the downwardly curved rear ends of plow beam or bar assemblies 8 which are drawn behind the wheel axis. All of this is conventional and is included for completeness of illustration, it being understood that my invention may be applied to this structure or to any tractor, riding plow or corn plow. Without altering the described structure, my improved rakes are attached in the following manner:

A rigid T-shaped member, comprising a leg 9 and a crosspiece 10, is mounted in substantially horizontal position behind each of the plow sets by securely holding the free end of its leg in lateral engagement with one of the plow beams, by means of a pair of bolt and nut assemblies 12 and a short plate 13. This plate and said free end of the leg are properly apertured to receive the bolts adjacent opposite edges of the plow beam, and until the nuts are tightened the T-member may be adjusted up and down the curved portion of the plow beam to get the desired height for the point of support.

The crosspiece 10 has two pairs of upwardly projecting integral eyes 14, the eyes of each pair being spaced apart and separated by a depressed portion 15. These eyes incline slightly rearwardly to overhang the flat rear vertical face of the cross piece. A rake-bar 16, similar to crosspiece 10, is arranged horizontally in surface contact with the lower part of the rear face of the latter. This position is maintained by a pair of pins 17 which pass through the sets of eyes 14 and through complemental eyes 18 that are formed integrally in spaced pairs on the upper edge of the bar 16. A coil spring 20 surrounds each pin 17 within the space afforded by each pair of eyes 18 and the depressions 15, and has ends, 22 and 23 respectively, bearing against the front face of the crosspiece and the rear face of the rake-bar. The springs are under substantial torsion when the parts are assembled and hence the bar 16 is firmly, though yieldingly, held in its illustrated position.

The rake-bar 16, which is about 18 inches long and disposed about 13 inches behind its plow set at a height of about 7 inches, rigidly holds the upper ends of a series of rake tines 24, which preferably are formed of number 9 steel wire and spaced about 1½ inches apart along the bar 16. The latter may comprise a single piece securely receiving the tines or it may be made in two parts clamped together with the upper ends of the tines between them.

In the disclosed arrangement the tines are substantially vertical and their lower ends pass horizontally through any humps or ridges created by the plows, to thus smooth out the topsoil and fill any furrows or ditches between the rows of plants. They simultaneously produce a dust mulch to conserve moisture. Hence soil erosion, both by water and wind, is effectively prevented or retarded.

The tines are sufficiently flexible to permit their lower ends to shift somewhat without overcoming the resistance of the torsion springs 20. However, if obstructions such as large stones and the like are encountered the springs 20 will be overcome and the entire rake-bar and tine assembly swung rearwardly. After passing the obstruction the springs immediately return the rake to operative position.

Due to the compactness and location of the springs 20 they can not be damaged or displaced by obstructions, nor will they accumulate or become jammed with weeds or other foreign matter. In fact, the entire attachment is of very simple and compact construction, without tendency to collect weeds. Should a few weeds be gathered at the lower ends of the tines, said ends will flex and readily discharge them rearwardly.

Having disclosed my invention in the manner prescribed by statute, what I claim and desire to obtain by U. S. Letters Patent is:

1. In combination with a cultivating plow, a T-shaped draw bar member extending rearwardly from the plow, a rake structure complemental to said member, and a compact spring and hinge assembly connecting said rake structure to said member with capacity to swing rearwardly.

2. In the combination defined in claim 1, said rake structure comprising a plurality of relatively flexible wire elements substantially vertically disposed and so related to the spring of said assembly that said spring will resist swinging movement until the wire elements bend substantially.

3. A cultivating attachment designed to be attached to and drawn behind a plow or the like, said attachment comprising a horizontal supporting bar; a rake bar disposed with its front surface facing the rear surface of said supporting bar; and at least one spring hinge comprising an elongated pivot member joining said bars, and a torsion spring surrounding said member and having its ends pressed against said bars to urge said front surface into engagement with said rear surface.

4. In the apparatus defined in claim 3, said bars having complemental eyes along their upper edges, said pivot member being arranged longitudinally of said edges and within said eyes, and said bars being shaped and arranged to afford room for snug reception of said torsion spring.

HENRY JESS.